US006293981B1

(12) United States Patent
Holderle et al.

(10) Patent No.: US 6,293,981 B1
(45) Date of Patent: Sep. 25, 2001

(54) ARRANGEMENT OF AN AIR FILTER AND A MEMBRANE CARBURETOR

(75) Inventors: Hans Holderle, Freiberg; Stefan Kummermehr, Waiblingen; Johannes Menzel, Stuttgart; Helmut Zimmermann, Berglen; Bernd Knödler, Winnenden; Horst Denner, Weinstadt, all of (DE)

(73) Assignee: Andreas Shihl AG & Co., Waiblingen (DE)

( * ) Notice: Subject to any disclaimer, the term of this patent is extended or adjusted under 35 U.S.C. 154(b) by 0 days.

(21) Appl. No.: 09/548,631

(22) Filed: Apr. 13, 2000

(30) Foreign Application Priority Data

Apr. 14, 1999 (DE) ............................................. 199 16 750

(51) Int. Cl.$^{7}$ ............................. B01D 35/30; F02B 77/00

(52) U.S. Cl. ............................. 55/318; 55/385.3; 55/497; 55/502; 55/DIG. 28; 123/198 E

(58) Field of Search .............................. 55/319, 318, 337, 55/385.3, DIG. 28, 502, 497; 123/198 E; 261/DIG. 68

(56) References Cited

U.S. PATENT DOCUMENTS 3,796,027 * 3/1974 Gumtow ................................ 55/502
4,425,145 * 1/1984 Reese .................................. 55/385.3
5,429,776 * 7/1995 Edlund .................................. 261/35
5,706,777 * 1/1998 Schlessmann et al. .......... 123/198 E

FOREIGN PATENT DOCUMENTS 4419084 12/1994 (DE) .

* cited by examiner

*Primary Examiner*—David A. Simmons
*Assistant Examiner*—Robert A. Hopkins
(74) *Attorney, Agent, or Firm*—Walter Ottesen

(57) ABSTRACT

The invention is directed to an arrangement of an air filter (1) and a membrane carburetor (2). The membrane carburetor (2) has an intake channel section (3) configured in the carburetor housing (4) and fuel-conducting channels (6) open into the intake channel section (3). The channels (6) are supplied from a fuel-filled control chamber (7) which is configured in the carburetor housing (4). The control chamber (7) is partitioned from a compensation chamber (11) via a control membrane (10). The compensation chamber (11) communicates with the housing (14, 16) of the air filter (1) via a compensation channel (13) downstream of an air filter element (39). The air filter housing (14) engages over the membrane carburetor (2) essentially on the side of the compensation chamber (11) and the clean chamber (24) of the air filter housing (14) communicates with the intake channel section via a connecting stub (37) which lies approximately at right angles to the intake channel section (3). The connecting stub (37) is used as a connection between the clean chamber (24) of the air filter (1) and a flow space (26) mounted forward of the intake channel section (3) in order to ensure a reliable compensation where available space is tight. The volume of the flow space (26) is greater than the volume of the connecting stub (37) and the compensation channel (13) branches away from the flow space (26).

19 Claims, 4 Drawing Sheets

ARRANGEMENT OF AN AIR FILTER AND A MEMBRANE CARBURETOR

BACKGROUND OF THE INVENTION

An arrangement of an air filter and a membrane carburetor is disclosed in German patent publication 4,419,084. Here, an air filter is mounted forward of the membrane carburetor to clean the combustion air. The air filter lies essentially above the carburetor on the side of the compensation chamber thereof. The intake channel section is formed in the carburetor housing and is connected to the clean space of the air filter via an intake stub configured about at right angles. An assembly-friendly insert connection of the compensation channel is not possible because of the closeness of the clean space to the compensation chamber. For this reason, a simple sealing collar is suggested which is intended to bridge the small distance between a connecting opening in the air filter housing and the connecting opening to the compensation chamber. Such a configuration of a compensation connection, however, presents the problem of dirt entry which can lead to a plugging of the compensation channel. This can cause operational disturbances of the engine driven by the membrane carburetor.

Furthermore, the known arrangement is very large whereby problems result because of the tight spaces in the housings of portable handheld work apparatus such as motor-driven chain saws, cutoff machines, brushcutters or the like. The filter surface is small because of the minimum component space which can lead to increased flow speeds. These can operate disadvantageously on the necessary compensation of the membrane carburetor.

SUMMARY OF THE INVENTION

It is an object of the invention to provide an arrangement of an air filter and a membrane carburetor which is so improved that an operationally reliable compensation of the level of contamination of the air filter is possible even where there are constraints as to space.

The arrangement of the invention includes an air filter unit and a membrane carburetor. The arrangement also includes: a membrane carburetor having a carburetor housing defining an air intake channel through which air can be drawn; the carburetor housing further defining an interior space; a control membrane mounted in the interior space so as to partition the interior space into a fuel-filled control chamber and a compensation chamber; channel means provided in the carburetor housing for conducting fuel into the intake channel from the control chamber; the carburetor housing having an end whereat the compensation chamber is located; an air filter unit having an air filter housing engaging over the carburetor housing on the end thereof; the air filter housing defining a clean air space disposed above the compensation chamber; the air filter unit including an air filter mounted in the air filter housing for passing air into the clean air space; a flow space disposed downstream of the air filter and upstream of the air intake channel; the intake channel communicating with the flow space so as to permit air to flow from the flow space into the intake channel; a connecting stub having a pregiven volume and extending between the clean air space and the flow space for facilitating the flow of filtered air from the clean air space to the flow space; the flow space having a volume greater than the pregiven volume of the connecting stub; and, a structure defining a compensation channel branching off from the flow space and connecting the compensation chamber to the flow space.

The combustion air, which is made available to the engine, is quieted because of the flow space upstream of the intake channel so that the high flow velocities (occurring because of the tight construction) have no influence on the power capacity of the engine. The flow space is configured with crevices in such a manner that space sections are provided in the shadow of the flow wherein essentially the static pressure at the clean air side of the air filter is present. The compensation channel therefore branches away from the flow space and preferably out of the space regions lying in the flow shadow.

Preferably, the flow space is configured to have an L shape when viewed in cross section. The longer leg essentially serves to provide the flow connection between the clean chamber of the air filter and the intake channel section; whereas, the shorter leg advantageously lies close to the compensation chamber and is provided for connecting to the compensation channel.

According to another feature of the invention, the connection of the compensation channel with the flow space is configured as an insert connection. The air filter housing has a wall which includes the connecting opening. This wall lies approximately at right angles to the control membrane of the carburetor. The wall of the air filter housing having the connecting opening is provided approximately parallel to the assembly wall of the air filter housing in order to ensure a simple assembly. In this way, the flow connections between the compensation chamber and the flow space as well as between the intake channel section and the flow space are simultaneously established when seating the air filter housing on the carburetor. The assembly wall exhibits a connecting opening between the flow space and the intake channel section.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
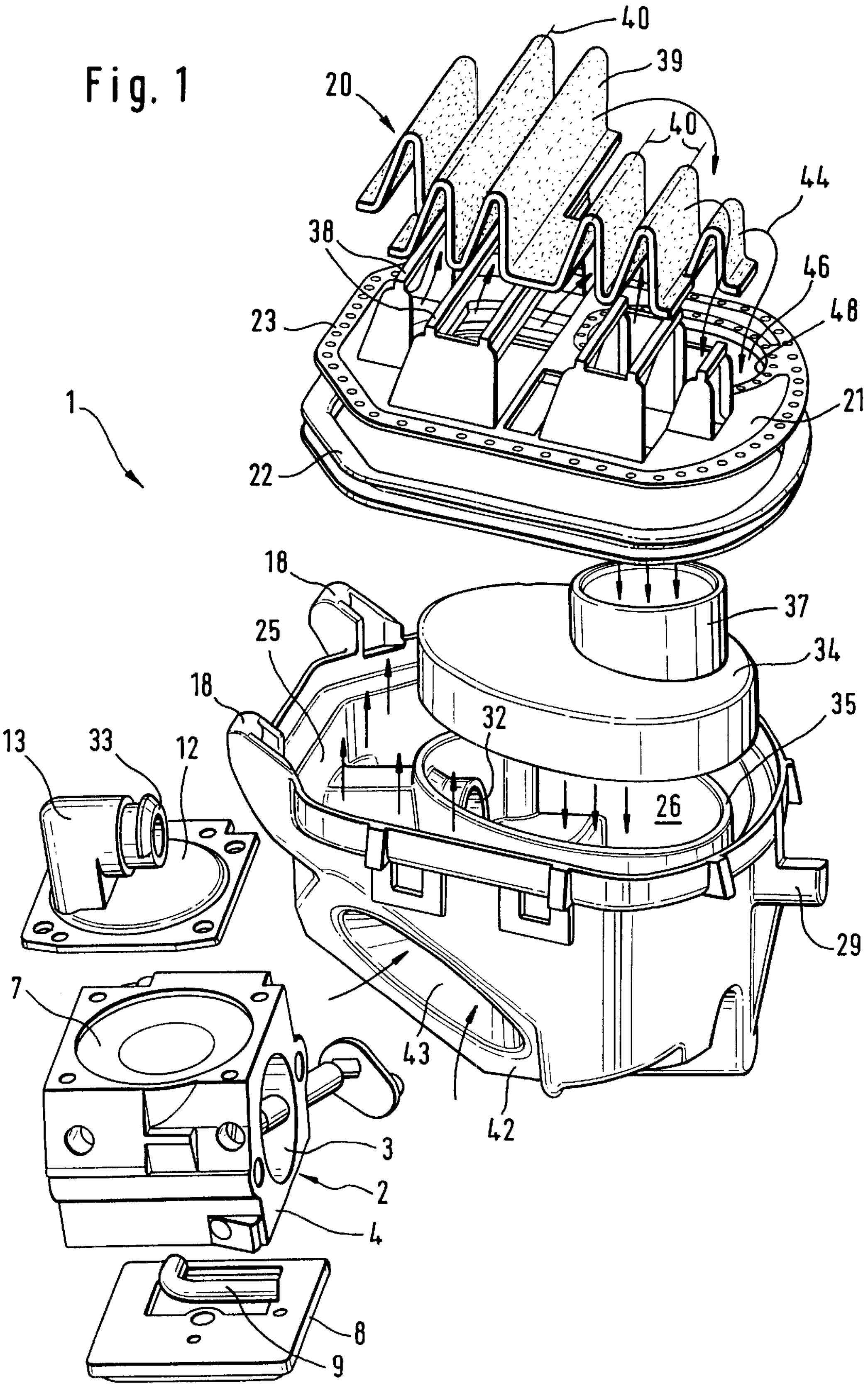
FIG. 1 is an exploded view of an arrangement of an air filter and a membrane carburetor in accordance with an embodiment of the invention wherein an air filter housing cover has been removed.

The arrangement of the embodiment shown includes an air filter 1 and a membrane carburetor 2 and is preferably used in portable handheld work apparatus having two-stroke engines or four-stroke engines as drive motors. An air/fuel mixture is supplied to an engine (not shown) in a direction of arrow 5 via the intake channel section 3 in the carburetor housing 4. Fuel-conducting channels 6 open into the intake channel section 3 for forming a mixture. The channels 6 are shown by broken lines in the carburetor housing 4 in FIG. 5.

The fuel-conducting channels 6 are supplied from a fuel filled control chamber 7. The control chamber 7 is formed in the carburetor housing 4 and is supplied with fuel via a fuel pump 8 flange-attached on the carburetor housing 4. The fuel is supplied via a fuel line 9 (FIG. 2) to the fuel pump 8.

The control chamber 7 is separated from a compensation chamber 11 by a control membrane 10. The control membrane 10 is held by being clamped between the carburetor housing 4 and a cover 12. A compensation channel 13 connects at the cover 12 and, in the embodiment shown, is configured as an angle stub. The compensation channel 13 is connected to the interior space of the air filter housing 1 downstream of an air filter element 20.

As shown in FIGS. 1 to 5, the housing 1 of the air filter comprises essentially a cup-shaped lower part 14 which is closed by a filter carrier plate 21. The filter carrier plate 21 shown in FIG. 1 is connected with its edge 23 in a seal profile 22 which comes into sealing contact engagement with an inner shoulder 15 on the upper edge of the lower housing part 14. Preferably, the edge 23 is injection-molded with a sealing profile.

The filter carrier plate 21 is fixed in its position on the inner shoulder 15 of the lower housing part 14 by an air filter housing cover 16 engaging over the filter carrier plate 21. For this purpose, the air filter housing cover 16 grabs form-tight with projections 17 in corresponding recesses 18 of the lower housing part 14 and is fixed on the side lying opposite the recess 18 by means of a turn latch 19 on a lug 29 of the lower housing part 14. The clean chamber 24 of the air filter 1 is formed between the filter carrier plate 21 and the filter housing cover 16. The air filter housing 16 is sealed by pretensioning with a sealing profile and, in this way, forms the upper boundary of the clean chamber 24.

A connecting opening 31 is formed in a wall 30 in the lower housing part 14 of the air filter 1. A flow space 26 of the air filter housing 14 is connected with the intake channel section 3 via the connecting opening 31.

The flow space 26 lies within a cup-shaped lower housing part 14 in the dirt space 25 of the air filter 1. The dirt space 25 substantially completely surrounds the flow space 26, as shown especially in FIG. 4.

Figure 5:
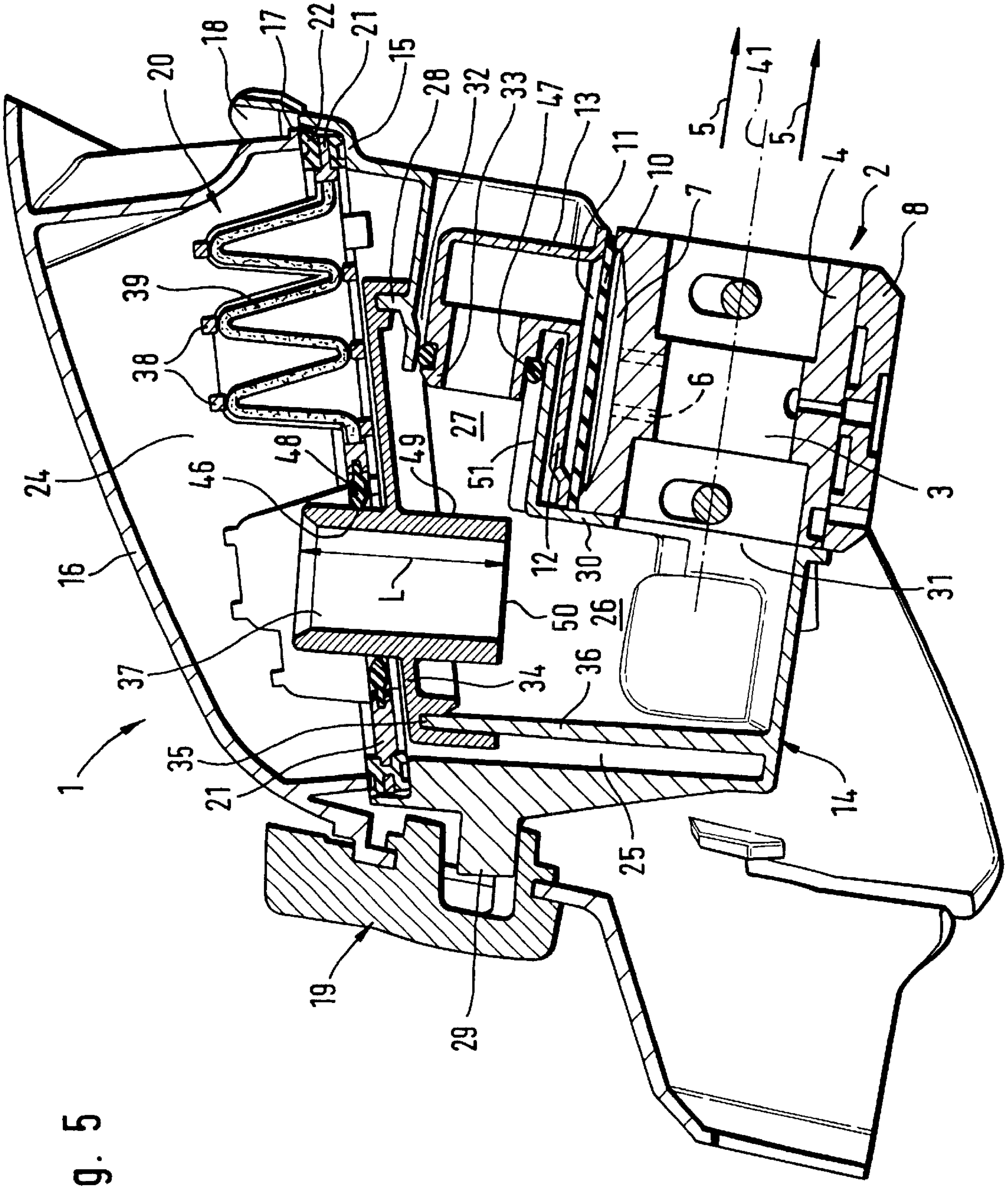

The flow space 26 is formed in the air filter housing 14 and has an approximately L-shaped configuration when viewed in cross section as shown in FIG. 5. The section 27 of the flow space 26 forms the shorter leg of the L-shaped configuration and engages over the membrane carburetor 2 on the side of the compensation chamber 11. The wall 28 of the section 27 lies approximately at right angles to the control membrane 10. In the wall 28, a connecting opening 32 is formed in which the facing end 33 of the compensation channel 13 is inserted preferably while using an O-seal ring 47. The compensation channel 13 is advantageously configured as one piece with the cover 12 of the compensation chamber 11.

The wall 28 of the air filter housing 14 includes the connecting opening 32 and lies advantageously approximately parallel to the wall 30 so that, during assembly of the carburetor 2, simultaneously the free end 33 of the compensation channel 13 can be seal-tightly inserted into the connecting opening 32. The wall 30 includes the connecting opening 31 for the intake channel section 3. The compensation channel 13 is connected to the flow space 26 in the region close to the compensation chamber 11. The compensation channel 13 is connected to the section 27. The section 27 then lies between the carburetor 2 (that is, the compensation 11 thereof) and the clean chamber 24 of the air filter 1.

Figure 4:
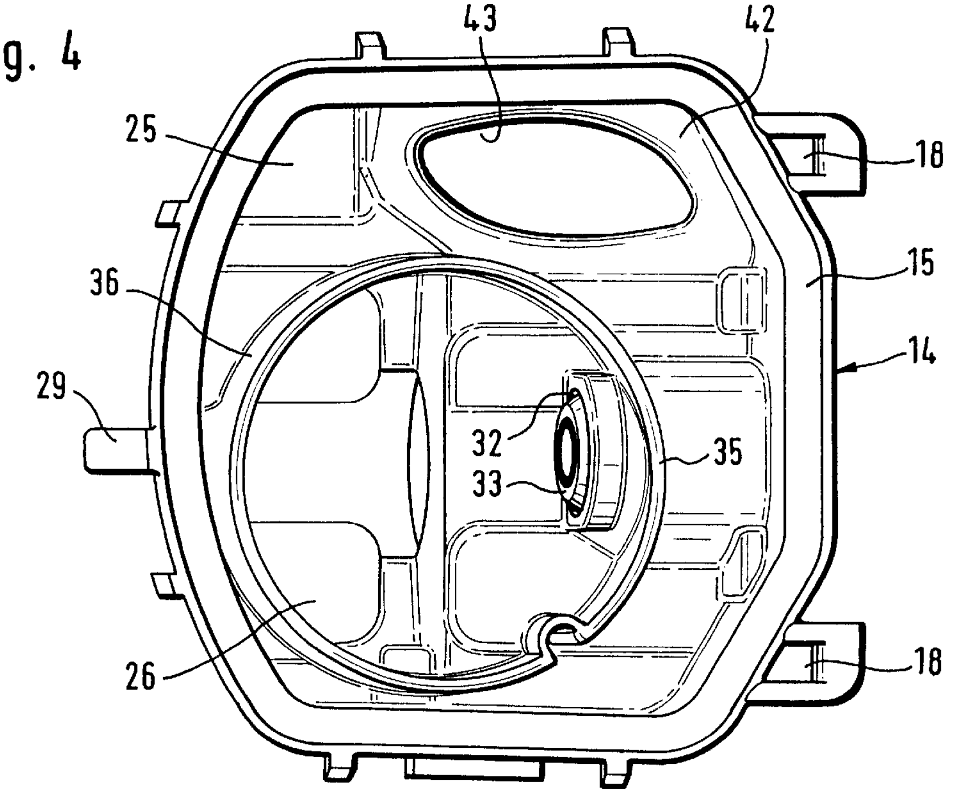
FIG. 4 is a plan view of an open air filter housing with both the filter carrier plate and cover removed; and, FIG. 5 is a section view taken along line V—V of FIG. 3 showing an arrangement according to FIG. 1 with a closed air filter housing cover.

As shown in FIG. 4, the outer wall of the flow space 26 is approximately circular-cylindrical and is closed by a cover 34 as shown in FIGS. 1 and 5. As shown in the section view of FIG. 5, the cover 34 engages with a U-shaped configured edge the facing circularly-shaped end edge 35 of the housing wall 36 of the flow space 26. In this way, the flow space 26 is closed with respect to the dirt or contaminant chamber 25 and the clean chamber 24 of the air filter 1.

The cover 34 carries the connecting stub 37 and the flow space 26 is connected via the connecting stub 37 to the clean chamber 24 of the air filter 1 which lies above the cover 34. As shown in FIGS. 1 and 5, the connecting stub 37 is configured as a resonance tube matched to the flow space 26. The connecting stub 37 projects with its ends partially into the flow space 26 as well as partially into the clean chamber 24 in correspondence to the selected length L. The end, which projects into the clean chamber 24, passes through the filter carrier plate 21 in an opening 46. A sealing lip 48 is injection-molded on the filter carrier plate 21 on the inner extending edge of the opening 46. The sealing lip 48 seals against the pipe surface 49 so that the separation of the clean chamber 24 from the contaminant chamber 25 is ensured.

The flow space 26 is formed significantly larger in volume than the volume of the connecting stub 37 so that the flow space 26 forms a quieting chamber for the in-flowing combustion air. The flow space 26 is connected forward of the intake channel section 3. The connecting stub 36 and the flow space 26 are matched to each other in such a manner that an acoustic Helmholtz resonator is formed which contributes to the attenuation of the intake noise. The section 27 of the flow space 26 lies in the flow shadow which is advantageous for the function of the compensation. This section 27 lies in the flow shadow because of the L-shaped configuration of the flow space 26 (when viewed in section) and the end of the connecting stub 37 which projects into the flow space 26. Essentially only the static pressure is applied to the clean air side of the air filter 1 in the compensation chamber 11. This is also facilitated because the edge 50 of the end of the connecting stub 37 lies approximately at the elevation of the base 51 of the chamber section 27. The end of the connecting stub 37 projects into the flow space 26. The compensation channel 13 branches off above the base 51. The connecting opening 32 thereby lies at the elevation of the tube surface 49 of the connecting stub 37.

The filter carrier plate 21, like the remaining parts of the air filter housing, is made of plastic and has a carrier frame 38 for a folded filter 39. The carrier frame 38 projects into the clean chamber 24. The folding lines 40 of the folded filter 29 advantageously lie approximately parallel to the filter carrier plate 21, which, in turn, is inclined at a slight angle to the longitudinal center axis 41 of the intake channel section 3. The folded filter 39 is preferably made of nonwoven fabric.

Figure 2:
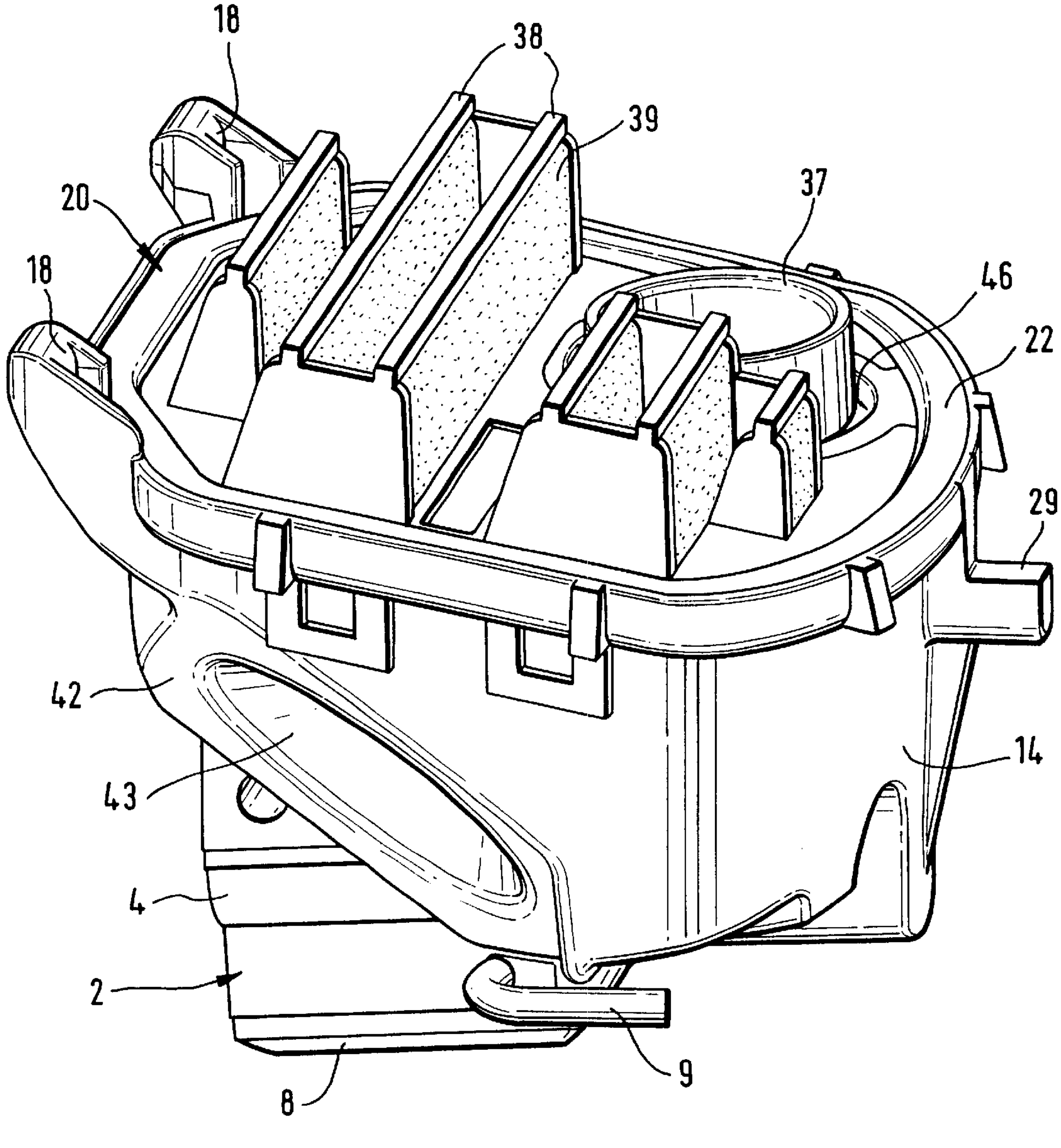
FIG. 2 is a view of the arrangement of FIG. 1 in the assembled state and without the air filter housing cover.
Figure 3:
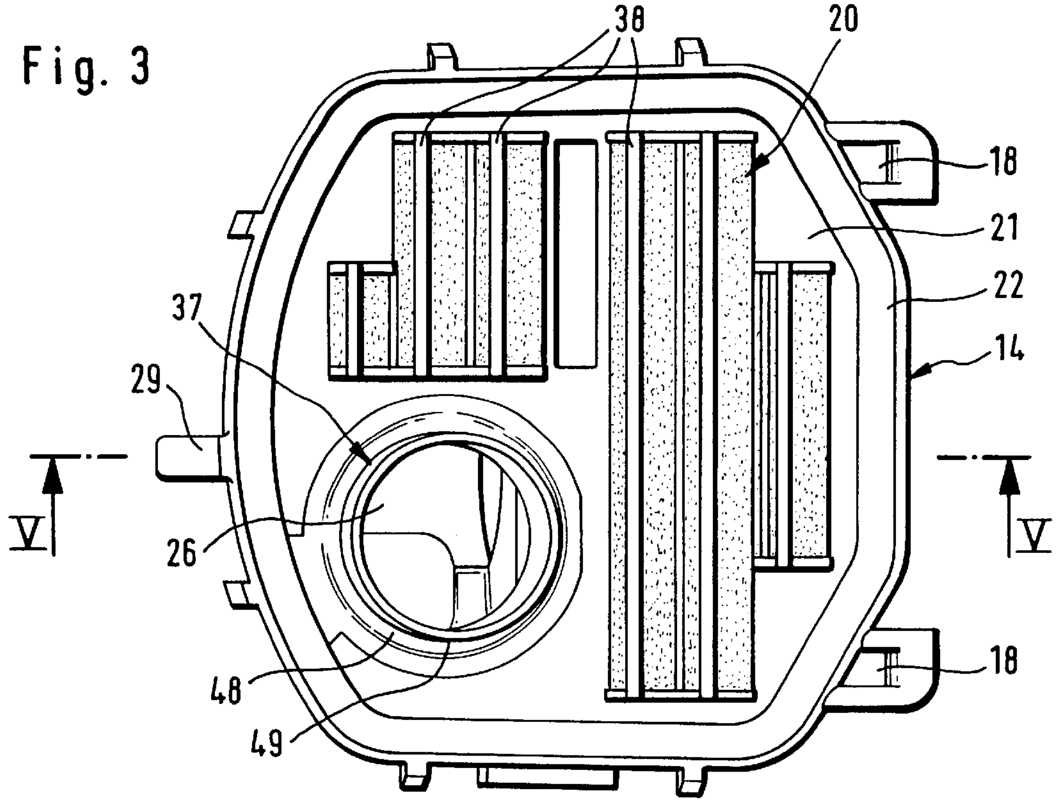
FIG. 3 is a plan view of the open air filter shown in FIG. 2.

As shown in FIG. 2, the lower part 14 of the air filter housing engages over the membrane carburetor 2 not only on the side of the compensation chamber 11 but also partially laterally. In this way, a relatively large contaminant chamber 25 can be made available and the surface of the filter carrier plate 21 can be increased thereby reducing the flow velocities in the air filter 1. The filter carrier plate 21 closes the contaminant chamber 25.

As shown in FIG. 4, the flow space 26 lies off-center to the cup-shaped lower part 14 of the air filter housing. An air intake opening 43 is formed in the side wall 42 of the lower part 14 at the region of the largest spacing of the outer wall of the lower part 14 to the housing wall 36 of the flow space 26. The air, which enters into the air filter housing 14, swirls around the flow space 26 and flows upwards along the inner housing wall 36 to the filter carrier plate 21. There, the air enters into the clean chamber 24 in the region of the carrier frame 38 after flowing through the folded filter 39. The clean combustion air flows in the direction of arrow 44 from the clean chamber 24 via the intake stub 37 downwardly into the flow space 26. The combustion air is inducted by the engine from the flow space 26 via the intake channel section 3 in the direction of arrow 5 as an air/fuel mixture. The air guidance has the advantage that heavier dirt particles drop out on the way upwards to the filter carrier plate 21 and remain behind in the contaminant chamber 25 without becoming seated on the filter element 20.

It is understood that the foregoing description is that of the preferred embodiments of the invention and that various changes and modifications may be made thereto without departing from the spirit and scope of the invention as defined in the appended claims.

What is claimed is:

1. An arrangement of an air filter unit and a membrane carburetor, the arrangement comprising:

a membrane carburetor having a carburetor housing defining an air intake channel through which air can be drawn;

said carburetor housing further defining an interior space;

a control membrane mounted in said interior space so as to partition said interior space into a fuel-filled control chamber and a compensation chamber;

channel means provided in said carburetor housing for conducting fuel into said intake channel from said control chamber;

said carburetor housing having an end whereat said compensation chamber is located;

an air filter unit having an air filter housing engaging over said carburetor housing on said end thereof;

said air filter housing defining a clean air space disposed above said compensation chamber;

said air filter unit including an air filter mounted in said air filter housing for passing air into said clean air space;

a flow space disposed downstream of said air filter and upstream of said air intake channel;

said intake channel communicating with said flow space so as to permit air to flow from said flow space into said intake channel;

a connecting stub having a pregiven volume and extending between said clean air space and said flow space for facilitating the flow of filtered air from said clean air space to said flow space;

said flow space having a volume greater than said pregiven volume of said connecting stub; and, a structure defining a compensation channel branching off from said flow space and connecting said compensation chamber to said flow space.

2. The arrangement of claim 1, said flow space being formed in said air filter housing.

3. The arrangement of claim 2, said flow space having an approximately L-shaped configuration and being disposed in said air filter housing so as to cause a section of said flow space to extend over said membrane carburetor at said end of said carburetor housing.

4. The arrangement of claim 3, wherein said section of said flow space lies between said compensation chamber and said clean air space.

5. The arrangement of claim 4, wherein said compensation channel connects to said flow space near said compensation channel.

6. The arrangement of claim 5, wherein said air filter housing has a wall defining said flow space and said wall having an insert opening formed therein; and, wherein said structure defines an end portion of said compensation channel insertable into said insert opening of said wall.

7. The arrangement of claim 6, wherein said wall of said air filter housing is approximately at right angles to said control membrane.

8. The arrangement of claim 7, wherein said wall is a first wall of said air filter housing; and, said air filter housing has a second wall defining an assembly wall having a connecting opening formed therein between said flow space and said intake channel; and, said first wall and said second wall are disposed so as to be approximately parallel to each other.

9. The arrangement of claim 8, wherein said air filter housing has a third wall and said third wall and said first wall conjointly define a dirt space substantially surrounding said flow space.

10. The arrangement of claim 9, wherein said flow space is off center to said dirt space.

11. The arrangement of claim 9, wherein said air filter housing includes a cover for closing off said flow space with respect to said clean air space and said dirt space; and, said cover carries said connecting stub.

12. The arrangement of claim 11, wherein said pregiven volume of said connecting stub is matched to said volume of said flow space so as to cause said connecting stub to be configured as a resonance tube.

13. The arrangement of claim 12, said air filter housing including an air filter housing cover; said air filter unit further including a carrier plate for holding said air filter; said carrier plate being disposed in said air filter housing so as to separate said dirt space from said clean air space; and, said clean air space being delimited essentially by said carrier plate and said air filter housing cover.

14. The arrangement of claim 13, said air filter unit further including a soft sealing profile mounted on the edge of said carrier plate.

15. The arrangement of claim 14, said carrier plate having an opening formed therein for accommodating said connecting stub; and, said air filter unit including a seal lip extending about said opening of said carrier plate.

16. The arrangement of claim 14, said filter being a folded filter mounted on said carrier plate.

17. The arrangement of claim 16, said folded filter having a plurality of fold lines approximately parallel to said carrier plate.

18. The arrangement of claim 1, wherein said structure also defines a cover of said compensation chamber and said compensation channel being formed as one piece with said cover.

19. The arrangement of claim 6, wherein said insert opening is at the elevation of the outer surface of said connecting stub.

* * * * *